US006103192A

United States Patent [19]

Stapleton et al.

[11] Patent Number: 6,103,192

[45] **Date of Patent: *Aug. 15, 2000**

[54] IMMOBILIZING AND PROCESSING SPECIMENS ON MATRIX MATERIALS FOR THE IDENTIFICATION OF NUCLEIC ACID SEQUENCES

[75] Inventors: Marilyn J. Stapleton; Rebecca Sundseth; Ke Wei, all of Durham, N.C.

[73] Assignee: GeneTec Corporation, Durham, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 09/060,282

[22] Filed: Apr. 14, 1998

Related U.S. Application Data

[60] Provisional application No. 60/043,683, Apr. 14, 1997.

[51] Int. Cl.[7] .................... G01N 21/00

[52] U.S. Cl. .................... 422/50; 435/6; 435/7.1; 436/518; 436/810

[58] Field of Search .................... 435/5, 6, 7.1; 436/518, 436/810; 422/50

[56] References Cited

U.S. PATENT DOCUMENTS

| | | | |
|---|---|---|---|
| 5,188,963 | 2/1993 | Stapleton | 435/299 |
| 5,382,511 | 1/1995 | Stapleton | 435/6 |
| 5,436,129 | 7/1995 | Stapleton | 435/6 |
| 5,451,500 | 9/1995 | Stapleton | 435/6 |
| 5,939,259 | 8/1999 | Harvey et al. | 435/6 |

FOREIGN PATENT DOCUMENTS 0502108 6/1998 WIPO .

OTHER PUBLICATIONS

Nucleic Acids Research 23:3788–9, 1995, Makowski et al., "Enhanced Direct Amplification of Guthrie Card DNA Following Selective Elution of PCR Inhibitors".

J. Clinical Microbiology 31: 1364–7, 1993, Yourno, J., Direct Polymerase Chain Reaction for Detection of Human Immunodeficiency Virus.

ISO Code™ PCR DNA Sample Isolation Device, 1995 and ISO Code™ Stix PCR Template Preparation Dipsticks, 1996 Schleicher & Schuell, Keene, NH, USA & Dassel, Germany.

*Primary Examiner*—Jeffrey Stucker

[57] ABSTRACT

The invention is a method and device for collecting and processing a biological specimen for the analyses of nucleic acids. A device comprises a matrix to which cells and viruses adhere and a handle to manipulate the matrix. The devices are used to collect, dry, transport, store and process small amounts of blood or other tissue. The matrix of the device is transferred to a reaction tube and amplifying reagents added to it. Nucleic acid sequences and relative quantities are detected and analyzed from the same specimen. The relative amounts of amplified nucleic acid from one or more particular RNA sequences are compared to one another and to the amount of amplified nucleic acid from DNA sequences serving as an internal control for the number of biological units per specimen. The relative amounts of amplified viral sequences from suspected viruses in the biological specimen and from recombinant viral particles serving as a viral quantitation standard enable estimation of viral burden in a given quantity of specimen.

16 Claims, 1 Drawing Sheet

IMMOBILIZING AND PROCESSING SPECIMENS ON MATRIX MATERIALS FOR THE IDENTIFICATION OF NUCLEIC ACID SEQUENCES

CROSS-REFERENCE TO RELATED APPLICATIONS

This application claims benefit of U.S. Provisional Application Ser. No. 60/043683 filed Apr. 14, 1997.

GOVERNMENT LICENSE RIGHTS

The U.S. Government has a paid-up license in this invention and the right in limited circumstances to require the patent owner to license to others on reasonable terms as provided by the terms of Grant Nos. GM47178, HL58320, CA76847, awarded by NIH.

FIELD OF THE INVENTION

The present invention relates to a process and device for analyzing a biological specimen for the presence of a nucleic acid sequence for diagnostic purposes. More specifically, it relates to immobilizing small amounts of cellular or tissue specimens on a matrix for the analysis of nucleic acids without extracting them from the specimen. Immobilized Sample Amplification, or ISA, is a means to enzymatically amplify a target sequence in an immobilized specimen either by synthesizing new nucleic acid sequences from one or more specific primers, or by ligating two sequences together based on their binding adjacently on a specific template. Detection occurs when a reagent recognizes target nucleic acid from the biological specimen and the reagent's presence is detected, or when a first reagent modifies a specific target sequence in a way that the modified product sequence is detected by the location where it binds to a second reagent, such as a probe array. ISA increases the labeled molecules or number of copies of the molecular target adequately enough for detection by signals that may be fluorescent, luminescent, calorimetric, electrical, chemical and any combinations thereof.

DESCRIPTION OF RELATED DISCLOSURES

In U.S. Pat. No. 5,382,511, a process to amplify nucleic acid targets was invented wherein a biological specimen was immobilized on the surface of a microscope slide or embedded in a gel matrix, for preparing and directly amplifying the nucleic acids in the sample. All patents and publications referred to herein are incorporated herein by reference. Prior to said method invention, nucleic acid amplification had been limited to solution reactions wherein the nucleic acids were first extracted from cells or tissue. A number of examples for using in situ amplification are given in U.S. Pat. No. 5,188,963. A photomicrograph of cells which had amplified and labeled DNA was included in U.S. Pat. No. 5,451,500 to show that the amplified fragments are retained in individual cells and such cells can be enumerated under microscopic observation. A number of subsequent publications support this method and even the localization of nucleic acid amplification products on cells treated in a manner in which only the chromosomes remain immobilized on the glass slides.

In the aforementioned patents, the biological sample was immobilized by drying and affixing it on a thin flat support. Thin supports were described as polymeric matrix materials, microscope slides and the like. Fresh or fixed biological specimens that were immobilized enabled the rinsing away of interfering factors of enzymatic amplification before it was performed. The method is immobilized sample amplification, also known as in situ gene amplification and including in situ polymerase chain reaction (in situ PCR). Gel matrices, novel for this use, and fixation by standard procedures, were described to assist the immobilization of the biological specimen.

In some nucleic acid diagnostic tests, microscopic observation of the biological specimen to look for morphological changes is productive and informative to a diagnosis. The degree of cell fixation needed to maintain cell morphology may be counterproductive to efficient detection or amplification because the most common cell fixatives cross-link the proteins and nucleic acids. Protease digestion is frequently used to reverse crosslinking because crosslinks interfere with hybridization to target sequences or terminates DNA primer extensions during DNA synthesis, thereby reducing the efficiency of amplification or hybridization detection.

In many DNA-based diagnostic tests, maintaining cellular morphology may be irrelevant to a diagnosis as long as the origin of the specimen is known. For example, the specimen may be aspirated from a series of a patient's lymph nodes, so that a pattern of metastasis from a primary tumor may be identified by the presence or absence of specific nucleic acid tumor markers in each of the lymph nodes.

The standard research protocol for sample preparation is to lyse cells to release the nucleic acids. Nucleic acids are then separated from the cell's peptides and lipids by phenol:chloroform extraction and then ethanol-precipitated to concentrate them. Varying amounts of the sample's nucleic acids are lost during the many extraction steps. Special DNA purification materials are available, but require filtration, centrifugation, or electrophoresis and add cost to preparation.

The conventional approach for clinical specimens is to perturb the cells or viral particles from a few cells or a small amount of tissue in order to release nucleic acids into solution and use a portion of the crude extraction. When this approach fails, the nucleic acid component of the crude extract requires further purification. Amplifying DNA or RNA from clinical specimens has been difficult to optimize because the clinical specimens present so many different parameters and potential inhibitors. Quick lysis techniques give rise to unpredictable or anemic PCR reactions. Anemic reactions are a continual challenge in making a robust diagnostic test because detection depends upon reproducibly amplifying the specific targets from a complex genetic background.

The in situ amplification process described in U.S. Pat. Nos. 5,382,511 and 5,451,500 uses enzymes such as polymerase or ligase, separately or in combination, to repeatedly generate more copies of a target nucleic acid sequence by primer extensions to incorporate new nucleotides or by ligations of adjacent complementary oligonucleotides, wherein each template generates more copies and the copies may themselves become template. By melting complementary strands of nucleic acids, the original strand and each new strand synthesized are potential templates for repeated primer annealing or ligation reactions to make and expand the number of specific, amplified products. A thermostable polymerase with reverse transcriptase activity and a thermostable ligase are now both commercially available and increase the choice of enzymes for both RNA and DNA detections. The amplification can either be primer extensions in one direction for linear amplification, or in opposing directions, for geometric amplification. The label can either be incorporated as labeled nucleotides or labeled primers for one-step detection or labeled probes may be added whereby the probes hybridize to the amplified products for detection. Other schemes for modifying, labeling or amplifying, include, but are not limited to, PCR (Roche Molecular Systems, Branchburg, N.J.), LCR, (Abbott, Abbott Park, Ill.), NASBA, (Organon Teknika, Durham, N.C.) or SDA, Becton Dickinson, (Franklin Lakes, N.J.), assays in which peptide nucleic acids recognize and bind target sequences and assays in which reagents recognize mismatches between the specimen's nucleic acid sequence and a known standard. These are variations of modifying or making multiple copies of specific nucleic acid templates for the purpose of detection, and when performed directly on an immobilized biological specimen, are within the scope of either this invention or the heretofore mentioned U.S. Pat. Nos. 5,382,511 and 5,451,500.

Whole blood DNA collected and stored on Guthrie cards was used for in situ gene amplification [Clinical Chemistry 41:477–479, 1995, Makowski et al., "In situ PCR Amplification of Guthrie Card DNA to Detect Cystic Fibrosis Mutations"]. This group incubated bloodspots in deionized water twice before adding the filter paper to an amplification solution for thermocycling. They suggested the water-based method worked by selectively disrupting erythrocytes while retaining leukocyte integrity, whereby in situ amplification of DNA present in the leukocytes was enabled because washing removed contaminants and retained DNA within the filter paper matrix. Groups prior to Makowski et al. practiced PCR on DNA only after it had been extracted from bloodspots because of technical problems believed to be caused by the impurity of DNA and the presence of natural inhibitors.

Genomic DNA is double-stranded, linked to histone proteins structurally in nucleosomes, and therefore readily preserved within a biological specimen, as evidenced by many reports of DNA amplification from ancient remains. Single-stranded RNA molecules, on the other hand, are more subject to degradation than double-stranded molecules because a nick in a single-strand breaks the molecule. In addition, they are located in the cytoplasm, where endogenous enzymes are present to degrade them as a natural mechanism of cell regulation. It is well-known in the art that isolating RNA requires extraordinary measures, such as using strong denaturing reagents and all RNase-free materials, to prevent degradation. Analyzing rare RNA species from fixed tissue sections is difficult because the cross-linking fixatives, such as formalin, and the elevated temperature during the paraffin-embedding process destroy RNA.

To study RNA, it is extracted and purified from the rest of the specimen components. Strong denaturing solutions are added to cell lysates to preserve RNA. Extensive measures are taken to recover RNA before it is degraded. To compare the RNA of a specimen with its DNA, protocols first recover RNA from a mixture of cell lysate and guanidinium isothiocyanate: then, DNA from the remaining fraction. Protocols are based on ways to differentially centrifuge or precipitate RNA and DNA, or separate the polyA RNA from the mixture with an oligo dT column. The separately purified nucleic acid fractions from a specimen are then pooled to competitively amplify a mRNA species and its genomic DNA template. Centrifugation and precipitation steps result in varying losses of nucleic acids so it is difficult to estimate the level of RNA expression in a specimen relative to the copy number of its gene. The protocols that have been developed utilize a larger amount of starting material, such as a whole organ of a test animal [BioTechniques 24:416–418, 1998, Evans et al., "Simultaneous Purification of RNA and DNA from Liver Using Sodium Acetate Precipitation"]. These protocols are not well-suited to clinical tests because so many laborious steps are required and the small size of most clinical samples limits the amount of nucleic acids that can be recovered after extraction and purification steps. Northern blots and in situ hybridization are more useful for studying abundant mRNAs than rare mRNA species. While amplification of rare mRNAs is possible, estimating and comparing expression levels among specimens is more difficult. Better methods are needed, especially in cases where the amount of biological specimen is limited and when screening large numbers of clinical specimens for the presence or absence of particular sequence is desired.

Microporous matrices are generally used in the field of molecular biology as a solid support media for proteins or nucleic acids transferred from electrophoretic gels. The Southern transfer technique is used to blot nucleic acids from gels onto a matrix in order to detect specific sequences by hybridization. In other instances, nucleic acids are filtered or spotted directly onto the matrix. The mechanism of the binding of proteins or DNA to matrices depends mainly on a combination of hydrophobic interactions, hydrogen bonding, and salt bridges. Nitrocellulose matrices were the first type of media used for Southern transfer and required baking in a vacuum oven to make the bond formed between the medium and the nucleic acid essentially permanent, permitting stringent assay conditions and reuse of the blot after removal of a bound probe. One criteria for solid supports is that all reactive sites on the surface surrounding the bound molecule be eliminated or rendered inert to non-specific probe interactions. Properties of different types of matrices made of diazotized media, nylon and ion exchange matrices are matched to different applications and the size of the molecules to be retained. DEAE anion exchange matrices are used for reversible transfer-elution to isolate RNA or DNA wherein different buffers favor the binding or release of the biomolecules to the medium.

More hydrophilic matrices have been formulated for better wetting and less flow resistance. Manufacturers have developed blood separation media to trap white blood cells preferentially. Another fibrous medium separates the cellular and noncellular fractions of whole blood, as it wicks through the porous spaces in the matrix. The chromatographic effect that occurs during wetting with a given volume of whole blood displays a constant ratio of 25% for the cell-free plasma fraction in the Hemadyne matrix [Pall Corporation, Port Washington, N.Y.]. The pore structure of the matrix and its low binding affinity allows even high molecular weight proteins to migrate unimpeded and separate in an aqueous phase apart from the blood cells. These matrices present a quick way to either filter white cells from blood or separate biomolecules in the plasma away from the red blood cells. The manufacturer recommends extracting the nucleic acids from the matrix by using a proteinase enzyme to free the DNA from the immobilized white blood cells. The cell lysate, or a more purified nucleic acid portion, is then added as template with other PCR reagents. Separating white cells or biomolecules away from the red cells is useful in sample preparation because the large amount of hemoglobin in blood is known to poison enzymatic reactions such as PCR.

SUMMARY OF THE INVENTION

The invention is a method and device system to study nucleic acids present in biological samples. The method and device of this invention minimizes the quantity of a specimen required for a diagnostic result because the nucleic acids present in an immobilized specimen are labeled or amplified directly without the losses that are associated with extracting them from the specimen. The invention is best suited to analyzing a particular nucleic acid sequence when the quantity of sample and, therefore, the chance of recovery after extraction, is limited. The present invention immobilizes a small amount of biological or clinical specimen such as blood, needle biopsy aspirate, cell smear, cell print or ultra-thin tissue specimen onto a supporting matrix material, and dehydrates the specimen quickly to prevent degradation of nucleic acids. The matrix material containing the immobilized specimen is then rehydrated with either a labeling or amplifying reaction mixture for the detection of nucleic acids sequences of diagnostic interest.

The method is suited to specimens of five to fifty thousand cells, but the preferred range is 200 to 2,000 cells. For blood and other liquid specimens, the preferred range is one to five micoliters. A device is used to collect and contain the specimen. The specimen may be air-dried or heated to hasten drying. A part of the device containing the specimen is added to a reaction mixture containing enzymes for amplifying specific target nucleic acid sequences. The device comprises a matrix to which cells and viruses adhere. Touching a matrix that is between 0.01 and 0.25 square centimeters to liquid and solid tissue specimens absorbs and adheres enough specimen to analyze nucleic acids. If more than ten microliters of blood, plasma or other liquid specimen is needed because the target nucleic acid may be present at less than one copy in a volume of ten microliters, then a larger volume may be passed through the matrix.

Using the method and device of the invention eliminates extraction of nucleic acids and is quicker and less laborious than using standard methods. The method can be automated and is cost-effective for screening large numbers of specimens. The method of this invention does not require the use of cross-linking or denaturing agents to analyze RNA species. Evidence shows that the invention provides a better environment for RNA analyses of minute biological samples than the biological specimens which are fixed or paraffin-embedded. The method of the invention can amplify a messenger RNA species from as few as five tissue culture cells and 2 $\mu$l-whole blood spots. The method of the invention can be used to compare expression of a messenger RNA relative to its genomic template and relative to another messenger RNA species. ISA is as sensitive for RNA as for DNA, herein shown in the Examples.

The method of the invention preserves RNA, as well as DNA, by dehydrating the specimen and storing it dry until the time of amplification. Both RNA and DNA can be analyzed in the same reaction. The relative amounts of particular DNA and RNA sequences per biological unit can be compared in amplification reactions because the number of biological units for studying DNA and RNA is a constant in an immobilized specimen. Products amplified from DNA are able to be distinguished from those amplified from RNA transcripts from the same gene by amplifying regions containing intervening sequences that are present in the gene, but absent in the mRNA, thus, altering the size and sequence of the two products. RNA can be amplified apart from DNA in an immobilized specimen by using primers that bridge intron splicing sites. Enzyme systems combining reverse transcriptase and polymerase are now commercially available and enable the synthesis of new DNA from RNA and DNA conveniently in the same reaction buffer without further interventions.

The genes in cells are normally diploid while the number of mRNA copies is regulated by a number of different cellular control mechanisms. In competitive amplification reactions between the DNA and RNA present in small numbers of immobilized cells, particularly in the range of less than 100 cells, the number of DNA templates of a particular gene in a specimen becomes a limiting factor before the number of RNA templates of that same gene. The diploid DNA in normal cells serves as an internal standard of specimen size for the RNA expression of any selected gene. Furthermore, the comparison of different genes in a specimen, whether, or not, the expression level of their respective mRNAs is included in the analysis, serves to monitor spontaneous amplification events of a particular gene between the specimen's normal and abnormal tissue. For example, a series of samples collected for immobilized sample amplification from a tumor biopsy can represent normal tissue a distance from the tumor, the border between normal and tumor tissue, tissue at the edge of the tumor and tissue central in the tumor. Amplifying two genes, or their expression, in the same specimen and comparing specimens taken from normal, and suspected or pathologically-positive, tumor tissue from the same individual provides information about somatic cell mutation and spontaneous amplification events.

Whether the specimen is blood or another biological fluid, or a biological specimen collected by touching a matrix material to the surface of a more solid tissue, the method is based upon using all genomic units of DNA and RNA present in the specimen in their native conformation by immobilizing the specimen containing them. By using a solid support for the attachment of cells or viruses present in the sample, the RNA present in the cytosol, which is not protected by a nuclear scaffold, remains amplifiable upon rehydration, without isolating it from DNA. Dehydrating a biological specimen onto a receptive surface immobilizes cells, viruses and other components. One reason why immobilization of the specimen is important is to study RNA and DNA in the same specimen, and therefore afford the opportunity to analyze the ratio of its RNA to DNA. Another reason is to be able to wash away soluble, potentially enzyme-inhibiting factors for successful enzymatic amplification of nucleic acids.

One application of the invention amplifies RNA of RNA viruses immobilized from tissue culture supernatant or human whole blood or plasma. Amplifying viral particles which have been immobilized and dried on a matrix is a more direct protocol because it does not depend on recovery of viral RNA after extraction. Serial dilutions of cellular and viral specimens dried on matrices were amplified in order to measure how few cells or virions present in a specimen are detectable. In general, amplification products are detectable from very low numbers of cells or viruses since in our tests some dilutions estimated to represent the presence of one to ten cells or viruses in a given volume were amplified successfully. More amplification product is obtained from the RNA sequences within viral particles than naked RNA when both are exposed to normal human plasma.

ISA is capable of detecting virus in blood when very little virus is present. RNA was amplified from ten microliters of blood taken from a horse previously infected with Equine Infectious Anemia Virus (EIAV). Extensive measures were required in experiments performed at the veterinary school to amplify EIAV from this horse because the samples have very low amounts of virus remaining. First, they isolated white cells by a Ficoll gradient, purified the nucleic acids from the white cells, and performed PCR twice. A portion of the first PCR reaction mix was reamplified in a second PCR reaction. Viral RNA or DNA was available more readily for enzymatic amplification from whole blood specimens by the ISA method than by standard purification and amplification methods.

Accordingly, by comparing results to known quantities of virus and blood volumes, the relative quantities of viral nucleic acid targets present in a specimen may be measured. A standardized amount of a mimic virus, one constructed to have a sequence variation to make it separately detectable, as well as sequences complementary to the target virus for competitive amplification, may be added to and immobilized together with the specimen in order establish a positive control for the reaction and quantify relative amounts of virus particle present in the specimen. The invention is a method of detecting viral nucleic acids further comprising means to determine quantities of said viral nucleic acid targets present in said specimen.

The present invention is useful in reducing the quantity of reagents needed for processing the specimen. Fibrous materials increase the surface area relative to volume over solid supports. Reagents fill the void volume of a fibrous matrix and readily access the target nucleic acids expected to be present in an immobilized biological sample. Sample preparation is therefore miniaturized and simplified by processing the sample immobilized on a fibrous matrix. The matrix material to which the sample is dried may be rinsed or pretreated to remove any interfering components of the specimen.

Because immobilized sample amplification does not depend upon isolation techniques, in which the recovery of nucleic acids may vary from sample to sample, rapid analysis of either single cells or a few cells is more achievable. In certain research applications it may be desirable to analyze the nucleic acids of a single cell, but the interpretation of results for diagnostic purposes will be more reliable when based on more than a single cell. An advantage of ISA is the capability to analyze the genetic material of a small amount of biological specimen for a variety of different reasons: surgical biopsy material may be sparse as in needle aspirates of suspected breast tumors and lymph nodes; a small region may be selected to determine the extent or border of the malignant characteristics of a tumor by analyzing somatic genetic mutations; and regions of tissue may be analyzed after genetic therapy to determine the spatial or temporal distribution of the genetic intervention. Anatomical orifices and surface lesions are non-surgical sources of biological specimens available for ISA. For example, skin lesions caused by ticks are a more direct source of material than peripheral blood to test for nucleic acid evidence of parasites. Fresh cervical tissue from suspicious zones may be transferred by touching to a matrix for the analysis of abnormal cytology, thereby eliminating scraping or incisions to do so.

In cases in which a few cells or viruses are contained in a larger volume of biological fluid than can conveniently be applied and dried to a small matrix, for example in the spinal fluid from lumbar punctures of patients with meningitis, the matrix itself may be used to capture the cells or viruses. Matrices have traditionally been used for separation and filtration by using the sieving mechanism of their pore size to separate biomolecules based on size. For ISA the capture does not need to be based on sieving but rather a natural affinity of cellular and viral surface biomolecules to attach to the matrix material. In our laboratory two different matrix materials were layered, each capable of binding cells, but the cells adhered to the matrix material it first contacted. The liquids continued to wick into the capillary spaces of the second matrix even though few cells were carried with it. It is obvious that for the purpose of keeping the matrix material small enough for a low volume reaction and minimizing the surface area of the matrix which enters the reaction, that the collecting device may be backed with an absorbent material which is not part of the matrix.

In many instances, fluids undergoing filtration are pressurized to force fluids through the matrix voids. Without pressurization, the capillary force of the aqueous liquids is the chief mechanism in filling the matrix voids, initially replacing the air in these spaces. Either using pressure, or only the capillary wicking action of the matrix, as a separation system is compatible with ISA. The fibrous and chemical nature of the matrices that comprise the sample collection device, and their ability to bind and immobilize the biological specimen containing genetic material to its surface area for the analysis of nucleic acids, is enabling for the device of the invention. The device of the invention may optionally contain absorbent material in addition to the primary matrix.

The present invention improves the containment and integrity of patient specimens by collecting and transporting the specimen via the matrix material. The specimen is dried onto the solid-support matrix and amplified without using any of the standard methods to remove nucleic acids from cells or viral particles. The immobilized specimen, and the nucleic acids present, are treated less harshly than standard treatments with organic solvents. There is no need to recover and transfer nucleic acids from one reaction vessel or mixture to another. More specifically, the present invention enables automated processing by integrating the sample preparation with an enzymatic labeling or amplification step.

In accordance with the present invention, the preferred embodiment of the device comprises a fibrous matrix that is of a thin, flat shape rather than spherical or cuboidal, wherein a biological specimen is brought into contact with the total surface area of the fibrous matrix and then dehydrated by evaporation. A preferred embodiment of the size and density of matrix fibers is dependent upon the type of specimen.

In yet another embodiment, the invention herein relates to a device comprising a fibrous matrix attached to a handle for the purpose of touching the matrix to biological tissue. A device with a handle collects a cellular specimen more easily than trying to hold the tissue specimen and touch it to a matrix or glass slide because the smaller matrix surface can be more easily directed to a specific area of the specimen.

In a broad aspect, the component device of the invention comprises means for immobilizing a biological specimen by first drying it to a matrix support and then filling the void volume of the matrix with liquid reagents to amplify, label or hybridize specific nucleic acids for detection. The invention is readily adaptable for use in an automated analyzer for DNA diagnostic tests.

DETAILED DESCRIPTION OF THE INVENTION AND PREFERRED EMBODIMENTS

Figure 1:
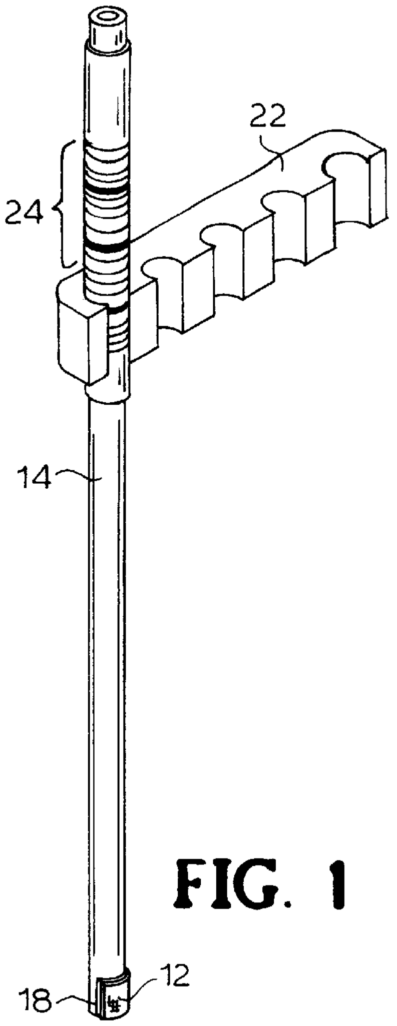
FIG. 1 is a drawing of a first embodiment of an ISA collecting device for the analysis of nucleic acids.

The invention broadly comprises a method to immobilize biological and cellular specimens on a matrix for measuring and detecting target nucleic acids in the specimens. In accordance with the present invention, the preferred embodiment of the device comprises a matrix that is of a thin, flat shape rather than spherical or cuboidal, wherein a biological specimen is brought into contact with the surface area of the matrix and then dehydrated by evaporation. Dehydration is more rapid if the matrix is thin. Dehydrating is significant because the volume of the original sample may be larger, relative to the reaction volume, than if the sample was introduced as a liquid into the same reaction volume. In other words, dehydration is a way to concentrate the cells or virions containing nucleic acids from an aqueous, liquid biological sample and process more nucleic acid analytes in a smaller reaction volume and in a smaller space. A membranous matrix comprising more thread-like fibers and smaller fiber diameters increases the surface area of binding sites to immobilize all of the different components of a biological specimen. Additionally, a surface area with more binding sites than needed to adhere just the cells also serves to bind and effectively sequester those molecules which may inhibit nucleic acid modifying and amplifying enzymes.

The capillary air space in a fibrous matrix causes liquids and soft tissue cells to flow and spread throughout the matrix. This wicking or absorbing property of fibrous matrix materials causes more cells to adhere to a fibrous matrix having an outer dimension equivalent to an area of a smooth, flat glass slide. Different biological tissues vary considerably in cell density and in the viscosity of their intercellular matrix material. A fluid tissue such as whole blood is expected to wick further into the void spaces of a matrix than a tissue such as adenoids that are less fluid. A matrix comprised of a low density of fibers will contain a larger specimen volume than a high density matrix with a lesser void volume. The physical dimensions and composition of the matrix are selected on the basis of the general size and viscosity of the specimen so that the density of its fibers is sufficient to absorb the liquid volume of the specimen and immobilize the cellular components.

Individual cell clusters, or cells comprising desired characteristics, may be identified visually or microscopically and collected by physical contact with a fibrous matrix. The matrix containing the selected cellular specimen may be dried and analyzed for specific DNA and RNA content without isolating nucleic acids from the cellular material. A 3×3 millimeter square area may immobilize upwards of 200,000 cells from a biological specimen; however the sample may only need to contain ten to twenty cells or gene targets for amplification in order to increase the number of target copies to a detectable level. The capacity of a fibrous matrix to immobilize cells, is a desirable feature to incorporate into a device for analyzing genetic targets.

The number of cells needed in a diagnostic sample is determined statistically based on whether the target nucleic acid sequences occur commonly or rarely in a cell population. A fibrous matrix having one-eighth inch sides (3.2 millimeters) and a depth of 0.020 to 0.040 inch (0.5–1 millimeter) that is filled with a fluid layer has a volume equivalent to 5–10 microliters less the space filled by the fibers. Reducing the total reaction volume to a range of 5–25 microliters will conserve reagents and lower costs.

In cases where nearly all the cells in a specimen are expected to contain the target sequence, only a few cells are needed in order to amplify genetic sequences present even at only the single copy level per cell. The specimen surface area needed for a few cells is in the range of less than 100 square microns and the volume of reagents is in the range of a few picoliters. In cases where the target is expected to be a rare event, the specimen surface area may be accordingly increased in order to contain around 25 microliters of reagents for thousands of cells. Liquid droplets of cells dry onto a planar surface with cells affixed generally in a monolayer, if the cells are not too concentrated in the solution. Embedded or frozen tissue is routinely cut into 4–10 microns sections that are nearly a monolayer or at most a few cells thick. With the device of the invention, cells are collected and immobilized similarly in a monolayer-like arrangement, but by means that do not involve embedding in a liquid media phase that solidifies for microtome sectioning. The immobilized, dehydrated specimen preserves labile mRNA and is directly accessible for the diffusion of amplifying and hybridizing reagents.

The dimensions of small fibrous matrix pieces, and a device for handling and enclosing them in a reaction chamber, will depend upon the density of cells and other biomolecules in the specimen. It is expected that specimens containing more cells and biomolecules will occupy more surface area of the matrix, depending on their ability to flow. The reaction volume needs to provide sufficient reactants so as not to limit biochemical activity. The surface area of the fibrous matrix used should not be in large excess of what is needed to immobilize the specimen since the remaining reactive sites on the matrix may bind the amplification enzymes, primers and nucleotides, labeled or not, limiting their availability for the amplification or detection reaction. Using 0.01% BSA in immobilized sample amplifications is routine as a precaution to cover reactive sites on matrix materials that may interfere with enzyme activity.

One embodiment of the invention is quantifying virions by immobilizing a known number of recombinant virions with a specimen containing an unknown number of another virus, and amplifying them competitively. Competitive amplification is a technique where different products are obtained by using the same primers. In this application a recombinant virus is constructed to have sequences mimicking the primer-binding sites in a virus which is being quantified. A known number, or a number estimated by accepted methods, of the recombinant mimic virus is added to a specimen containing an unknown number of viral particles and amplified in the same reaction. Comparing the amplification products from the two competing amplification events is used to estimate the number of virions present in the specimen. Many labeling techniques and measuring instruments are known to molecular biologists to quantify the amplicons of competitive reactions.

The genome of a recombinant virus is amenable to engineering any number of primer sequences for competitive amplification, and also any number of probe sequences for detection, of multiple viruses and strains or mutants of a virus. Designing differences in the length or internal sequence of the recombinant virus allow the number of its amplicons to be discriminated from, and compared, to the number of amplicons generated from a target virus, a panel of different viruses, or other kinds of nucleic acid templates found in biological specimens. The Viral Quantitation Standard, or VQS, is engineered to have length or sequence differences to discriminate its amplification products from those of HIV-1. A recombinant retrovirus is suitable for quantifying HIV-1, also a retrovirus, by ISA directly from plasma or blood. Recombinant retroviruses are available that are replication-deficient in order to make VQS production safe. They are propagated in packaging cell lines such as PA317 [Mol. and Cell. Biol. 6:2895–2902, 1986, Miller et al., "Redesign of retrovirus packaging cell lines to avoid recombination leading to helper virus production",] and the titer of batches can be determined by colony-forming assays [Mol. and Cell. Biol. 7(10):3394–3401, 1987, Overell et al., "Nature and specificity of lymphokine independence induced by a selectable retroviral vector expressing v-src"]. The VQS can be added to the specimen before drying, or be predried on a matrix and amplified later with a dried specimen. Amplification methods have become an accepted means to quantify viral burden because viral co-culture methods for HIV-1 are tedious and generally underestimate the number of infectious viral particles. However, the ISA application of competitive amplification is different from prior art because a known number of viral particles is used as the standard rather than a known number of RNA molecules. ISA assays using engineered recombinant viruses, or cells for that matter, are also capable of analyzing and quantifying nucleic acid sequences that determine drug-resistant mutations. It is possible to estimate the proportion of viral particles, or cells, in a specimen exhibiting any one of a number of known mutations.

The RNA packaged inside the envelope of retroviral particles is a template for reverse transcription-ISA (RT-ISA) that is less vulnerable to RNAse degradation than naked, unpackaged viral RNA. Brief heating to dry does not appear to subject the retroviral RNA strands to breakage. Longer heating is not recommended because of the risk of breaking RNA strands. When RNAses are known to be active in a specimen; adding anti-RNAse agents to the amplification reaction mixture improves reproducibility of reverse transcription.

A time course of 90° C. heat treatments after rehydrating the dried cells, and before RT-ISA [using TNFα primers that discriminated RNA from DNA], did not affect amplicon signal from DNA; but it diminished amplicon signal from RNA. Heating the immobilized cells and matrices in water for 1 to 20 minutes at 90° C. gradually eliminated any evidence of RNA amplification, but the capability to amplify DNA was unchanged.

Other aspects of the invention identify which matrix materials are appropriate and how they are configured in devices for collecting and storing specimens as well as amplifying and detecting the presence or absence of specific sequences in their nucleic acids. The devices of the invention have advantages over other collection devices because they simplify sample preparation steps and provide convenient, safe transport and storage. The devices replace columns and reagents made especially to isolate nucleic acids. Using the devices eliminates preparative steps such as filtration and centrifugation. Much less blood or tissue is needed for nucleic acid analyses than what is being collected in standard collection devices. The devices are an alternate collection device that reduce the amount of blood collected and eliminate any unnecessary blood handling after collection. The devices are comprised of a matrix material to support the specimen and means to conveniently collect and handle the specimen on the matrix. The matrix material has surface area sufficient for the attachment of specimen components and for the rapid evaporation of water away from the rest of the specimen components. A device for the collection of a single specimen may have multiple units in order that each unit may be separated from the other units and processed individually. The devices are designed for convenient handling in a variety of formats. Other packaging may be added to keep the device clean before use and protect the specimen from contamination and degradation after use.

To determine whether a matrix material has surface characteristics which are suitable for the devices of the invention, a simple test can be used. A biological specimen comprising cells is applied and dried onto the surface of a candidate material. Drying can be hastened by heating the material uncovered to a temperature in the range of 55 to 85° C. for a few minutes. The material is rehydrated with an aequeous dye solution, such as 10% trypan blue, for five minutes and rinsed briefly with water. The material is observed under a microscope for the presence of dye-stained cells on the surfaces of the matrix material. If the number of cells attached to the material's surface is generally representative of the number of cells in the biological specimen, the material is suitable. Thus, the material can be tested first for its cell-binding qualities and then tested for its performance in nucleic acid analyses. In our experience the same materials which adhered cultured cells with successful results also perform well with blood, cheek cells and envelope viruses. The materials that were successful in the analysis of DNA from cellular specimens were also successful for the analysis of RNA in cells and, also, of viruses. The final test for a material that will bind viruses, since they cannot be seen under the microscope, is to analyze one of its viral genetic sequences after drying it on a material to which cells will attach. The adherence test is simple and quick enough to screen any number of materials.

The applicants performed hundreds of genetic detection reactions on biological specimens, namely blood and cheek cells. Fresh whole blood from fingerpricks and cheek cells collected by either whole mouth fluids, transmucosal exudate and buccal smears, were immobilized on many different matrix materials from several manufacturers (namely, Pall BioSupport, Port Washington, N.Y.; Porex Technologies, Fairburn, Ga.; Schleicher & Schuell, Keene, N.H.; Tetko, Depew, N.Y.; DuPont Polymers, Washington, W.Va.; DuPont Nylon, Wilmington, Del.; 3M, St. Paul, Minn.; Filtrona, Richmond, Va.; Gelman Sciences, Ann Arbor, Mich.; Magna Separations Inc. (MSI), Westboro, Mass.;). Band intensities of products amplified from an equivalent number of cells, or viruses, were compared between those dried on matrices, those dried in the reaction tube without any matrices, and those added directly to reactions without first drying. The latter two procedures either do not show any product bands, or show less intense bands, than the amplified product bands from cells and viruses that were dried on a matrix. Photomicrographs taken after ISA thermocycling revealed cellular structures adhering to the surface of the fibers of Tetko's #3-3710 and Pecap polyester. It was concluded after microscopic observation comparing the size of biological cells and the porous spaces of both nylon and polyester woven fibers that trapping cells by particle size was not a criterion for the method because the size of the pores far exceeded cell diameters.

Matrix materials comprised of the same polymer may exhibit different surface properties depending upon what manufacturing processes, additives or coatings are used. It is known among molecular biologists that since proteins and nucleic acids are negatively-charged molecules, positively-charged nylon membranes are frequently used to bind them for analysis. One may assume that because cell surfaces also contain negatively-charged molecules, these membranes would be useful for the method of the invention. This assumption was not without exception in our experiments. Nylon and polyester-extruded fibers were more durable and generally gave better results than some of the positively-charged nylon membranes. Regardless of a material's composition, its surface characteristics may be tested for cell adherence properties that are favorable for ISA.

A number of factors are useful, but not necessary, to consider as backgound for selecting matrix materials. A variety of different antistatic agents are commonly needed to counter the effects of molding, extruding, spinning, and other processes for manufacturing synthetic matrices and fibers, which introduce static electricity to their surfaces. It is known in the art of polymer manufacturing how to make the surface of nylon or polyester polymers have a more positive, or a more negative, charge. Antistatic agents and surfactants (chemicals known as wetting agents because they reduce surface tension) may be included in the chemical formulation of a material, or applied to it in a post-manufacturing treatment, to render desired surface characteristics. Because biological specimens are aqueous-based, treatments causing a surface to become more hydophilic aid in spreading specimen components over the matrix surface. A matrix with hydrophilic surfaces encourages rapid absorption of aqueous body fluids into its void volume and enables the specimen to be concentrated by means of evaporative drying. Acidic treatments are known in the textile industry to combat static charges which accumulate during manufacturing processes. In our experience, a mild acidic treatment on untreated, DuPont Polymer's Tynex 612 nylon filaments changed their surface characteristic enough to retain cells, which was not observed on the untreated filaments.

The simplist embodiment of the device of the invention is placing a specimen on a matrix comprised of a 3 millimeter square of woven Tetko nylon 3-3710 into a dry reaction vessel. For example, volunteers scraped cells from the mouth inside the cheek with a polypropylene tube and transfered the cells to the matrix in a reaction tube for ISA. A preferred embodiment of the device of the invention is a matrix comprising woven nylon and polyester fibers, supported by a handle from which the matrix may be detached. Different embodiments of a matrix material, upon which the sample is immobilized, include, and are not limited to, fibrous matrices, comprising one or more types of natural or synthetic fibers, that are fibers laid down in a pattern to encourage lateral or vertical flow, absorbent wicking materials, a woven matrix, two or more matrices layered together and the like. The matrix may comprise a sticky surface or a pattern made by manufacturing techniques to increase surface area of a material to which cells and viral particles naturally adhere, or have been coated to increase adhesion. The matrix itself may be an internal part of a reaction vessel. A handle is useful to manipulate and collect a biological specimen, but it is not necessary. The sample collecting matrix, and any other supporting material that becomes part of the reaction, are selected on the basis that they do not inhibit ISA or the analysis of nucleic acids.

Turning to the drawings, the embodiment shown in FIG. 1 is a piece of matrix attached to the end of a handle. The ISA device 10 is comprised of one or more matrices 12 for the purpose of immobilizing a biological specimen and a handle 14 to facilitate placement of the matrix 12. The handle 14 is provided to manipulate a small matrix 12 into close proximity of the desired area of the biological specimen and to contact the specimen area and transfer cells 15 from the biological specimen to the matrix 12. The device 10 has means to separate the handle 14 from the matrix 12 in a manner that controls placement of the matrix 12 during detachment, allowing the matrix 12 to be placed in a reaction vessel.

One means of attachment are adhesives that have been shown previously to be compatible with ISA. An adhesive 18 is selected based on the aggressiveness needed for different applications and types of specimen. For example, in FIG. 1 an agressive transfer adhesive 18, such as 3M #443PC, was placed between a piece of matrix 12 and the outside of a five-inch long polypropylene tube handle 14 in order to keep the matrix 12 attached as cheek cells were collected from the mouth. After collection, each matrix 12 was detached from the handle 14 by cutting off the tip of the tube into a reaction vessel.

The matrices 12 are dried and transported to a processing area. Dehydrating a biological specimen onto a receptive matrix surface immobilizes cells, viruses and other components. Immobilization is important so that soluble, potentially enzyme-inhibiting factors may be sufficiently washed away for successful enzymatic amplification of nucleic acids. By immobilizing the sample on the matrix of the device, extraction procedures are eliminated; thus, none of the target nucleic acids originally present in the sample are lost because they were not recovered during extraction steps. The matrices 12 are rehydrated and amplified with a reaction mix containing the components described in the Examples. The aqueous solution of biochemically active enzymes and amplification reagents is readily absorbed into a dehydrated matrix and rehydrates the biological specimen.

It is possible to determine the appropriate size of the matrix to immobilize the amount of a particular kind of clinical specimen needed to routinely amplify genetic targets. The rehydrated specimen immobilized on the matrix is subjected to appropriate temperature conditions and amplified products in the reaction solution are detected by any number of means known in the art. Products were visualized by agarose gel electrophoresis and UV illumination of ethidium bromide fluorescence in most of the Examples. However, it is understood there are many other ways known in molecular biology to detect nucleic acids, many of which detect fewer molecules than can be visualized by the detection methods used herein.

Figure 2:
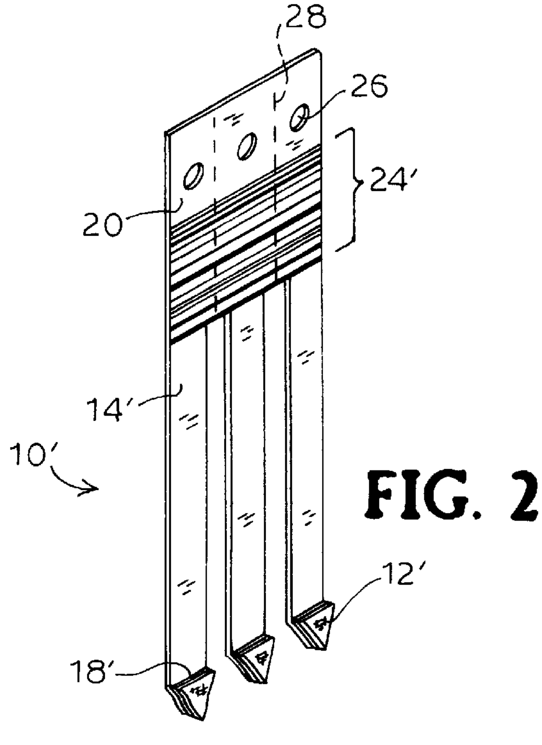
FIG. 2 is a drawing of second embodiment of an ISA collecting device for the analysis of nucleic acids.

FIG. 2 illustrates a design that enables a large assembly of devices 10' to be made at one time. A set of devices is fabricated by cutting a sheet of plastic as long as a narrow strip of material (circa a 3 millimeter-width) for the matrices 12' at one end and wide enough to connect the long supports of the devices at the other end, circa 40 millimeters wide. A double-sided adhesive tape 18' of the same width as strip of matrix 12' is affixed at one edge of the plastic sheet handle 14'. The matrix 12' strip is applied to the other side of the adhesive 18'. Using a less aggressive adhesive 18', such as #9449 (3M), to affix a matrix 12' enables it to be released from its handle 14', after a specimen is applied, by sliding it off with a tool or grasping it between the rim of a reaction tube and its lid. A pattern of cuts is made with scissors, guillotines, dies or punches through the plastic sheet handle 14', the adhesive 18' and the matrices 12' so that each device 10' will be released from the others at the matrix end of the plastic sheet handle 14'. As shown in FIG. 2, the devices remain joined along a spline 20 at the other edge of the plastic sheet handle 14'. Large, laminated assemblies can then be cut into single devices or groups of any number.

The distance of the space cut out between matrices 12' is different for different applications based on 1) spacing a group of matrices far enough apart to avoid contact between different specimens, 2) spacing a group of matrices in close alignment to conveniently collect multiple samples of the same specimen, and 3) spacing the matrices at intervals to accommodate their transfer to a particular kind of reaction vessel. For example, spacing intervals of 7 or 2.5 millimeters for a 2 millimeter matrix enables easy transfer to 96-well and 384-well microplates, respectively. The number of matrices in a group can match the number of wells in rows of the microplate. Similarly, individual devices can be guided into a microplate format by assembling them in a fixture 22, FIG.

1, made for holding devices 10, and connecting them in the spacing of intended reaction wells. Bar code labels 24 on ISA devices enable scanning them in rows as they are assembled in the fixture 22 and transferred to microplates in order to track samples during processing. A row of openings 26 punched in the spline 20 enables the devices to be moved by sprokets during manufacture, storage or sample handling.

Quality control manufacturing of the matrix 12 is expected to maintain consistency in fiber diameter, chemical composition and density. Depending upon the nature of the fibrous matrix, cutting may weaken the ability of the matrix fibers to stay together and require special cutting methods and a backing for physical support. Fabrication of devices 10 comprising very small pieces of matrix material is facilitated by affixing a length of matrix material to other supporting materials before cutting it into individual pieces for each device.

In an embodiment for collecting and concentrating viruses from blood or plasma, a device was made by cutting the end of a polypropylene, five milliliter pipette tip and heating it, along with a 4-millimeter diameter piece of nylon matrix, #3-3710, until the polypropylene fused with the matrix. An aliquot of 200 microliters of blood and one milliliter of plasma were passed sequentially through such devices. The matrices provide surfaces for viruses to adhere, capturing them from a larger volume than could be applied to the small piece of matrix. It is understood that other embodiments of the sample collecting and processing device are within the scope of this invention, regardless of the mode of manufacturing or the intended type of biological specimen.

A group of devices 10 is packaged for individual use and opened at the site of sample collection by the patient or a medical professional. The device 10 is guided by its handle 14 to conduct the matrix 12 into contact with the biological specimen. The packaging in which the specimen matrices are returned and stored enable drying the specimens and keeping them dry.

Other embodiments include a matchbook arrangement. The plastic sheet, or a coated paper, used as the handle 14 in FIG. 2 may be large enough to fold and crease twice in the manner of a matchbook cover over matrices 12 arranged like tips on matches in a matchbook. The spline 20 may have perforations 28 along a tear line for easy separation of single devices from a group. Other embodiments have mechanisms to release the matrix from the handle such as a knock-out pin or peeling open a laminated assembly that separates the matrix portion from adhesives holding it in position. Adhesives 18 may be either materials spread as a liquid, or a linered, pressure-sensitive adhesive transfer tape, placed between the matrix 12 and the handle 14.

Yet another embodiment of the device comprises a narrow roll of matrix, with or without a backing, contained in a housing having means to advance the roll and cut or peel to release sections of matrix as needed. Housings for applying labels to products and tape to packages are examples of similar mechanisms. Another embodiment of a housing means is similar to a pill dispenser, in which individual matrices are stacked in a cylinder with a first means to expose one matrix at a time for gentle pressure to contact the specimen and a second means to eject the matrix from the container.

A further embodiment of the device is that it may provide a measure of the amount of biological sample that is collected. For example, a measured amount of a particular fibrous matrix in the device will absorb a predetermined quantity of a liquid biological specimen. Therefore, when size and adherence of the collecting surface area of a device has been established to collect the same amount of a particular biological specimen within an acceptable range, the results may be expressed in quantifiable terms. For example, the device of invention may be a method of detecting and determining the relative quantities of nucleic acid targets, such as the prevalence of viral particles, present in a given quantity of specimen.

Another aspect of the invention includes a new detection system other than gel electrophoresis, or hybridization stringency alone, to analyze the amplified products. Gel electrophoresis is generally used to analyze products amplified from two primers by documenting their expected fragment length. In order to detect multiple mutations from the same sample, it is possible to use a probe array representing different sequence combinations to which the complementary nucleic acids of the amplified product bind upon diffusing from the immobilized cells. By immobilizing a clinical specimen on a first matrix surface and detection probes on a second surface, both in the same reaction chamber, sample preparation can be integrated with amplification and detection into a single reaction chamber. There are numerous schemes for labeling, transmitting and detecting signals based on the hybridization of complementary nucleic acid sequences that may be applied to detect products of immobilized sample amplification, eliminating the need for gel electrophoresis altogether. The more sensitive the detection, the less amplification product is needed to transmit a signal.

Methods based on hybridization can discriminate minor sequence differences. A new detection scheme involving a positional array was developed to more accurately detect a single base mutation after ISA. The amplified products are denatured and annealed to at least one capture oligonucleotide sequences, comprising the base in question at the 3' end, and immobilized in a probe array on a thin, flat supporting material. The annealing reaction contains a denatured, or single-stranded, labeled probe comprising adjacent, complementary sequences and a ligase to join the 5' end of the labeled, detector probe to the 3' end of the immobilized capture probe. The detector probe hybridizes to complementary sequences of the amplified product that are directly adjacent to the capture probe. Ligation occurs if the base of the amplified product is an exact complementary match to the base in the most 3' position of the capture probe. Ligation immobilizes the labeled, detector probe to the 3' end of the capture probe. Positive signals are observed at specific location sites where the labeled detector probe was ligated to the immobilized capture probes. Because ligation occurred only to positions where the capture probe contained a sequence complementary to the sequence of the amplification product and an exact base match at the ligation juncture, the method of detection has the ability to discriminate single-base mutations in a specimen with better accuracy than hybridization alone. If oligonucleotides are used that differ only in the 3' position, then alleles can be determined and homozygotes distinguished from heterozygotes. Furthermore, multiple oligonucleotide sequences at different array positions enable several mutation sites of the specimen to be analyzed in the same detection reaction.

EXAMPLE 1

ISA in Whole Blood

Early experiments in our laboratory confirmed that ISA products from whole blood spotted on matrices were the same as the products obtained from amplifying purified human DNA spotted on the same type of matrix. A specific 524 base-pair fragment was amplified by using primer extensions from two opposing primers complementary to a region of the human p53 gene. 100 $\mu l$ reactions were comprised of 10 mM Tris-HCl, pH 8.3, 50 mM KCl, 0.01% BSA, 0.2 mM of each of the 4 standard dNTPs, 1.5 mM $MgCl_2$, 0.1 $\mu M$ primers and 1.25 Units of Taq DNA polymerase (Boehringer Mannheim, Indianapolis, Ind.). Thermocycling conditions were an initial denaturation at 94° C. for 4 min., followed by 30 cycles of 94° C., 45"; 52° C., 45"; 72° C., 1' and then a final extension at 72° C. for 5'. Following thermocycling, twenty microliters of each reaction were electrophoresed on a 1.5% agarose gel and products visualized with UV-illumination of the ethidium bromide stained gel. The size of bands representing ISA product from five-microliter, dried whole blood spots on Hemadyne, that were rinsed briefly with water and 1 mM HCl, were as predicted by the primers selected, and as measured by molecular weight markers, and the same size as product from a dried spot of 100 nanograms of human genomic DNA. Reports by others in the literature that the presence of hemoglobin inhibits enzymatic amplification apparently is minimized when the blood is immobilized on a matrix.

Further experiments compared immobilizing blood on a variety of different matrix materials. Fresh whole human blood was collected directly from a finger prick and 2 microliters were spotted onto each of several small squares of different matrix materials. The sizes of the matrices were approximately 4–9 $mm^2$. Within seconds the blood flowed into the intramatrix spaces and in a few minutes the blood components dried to the surface of the matrix fiber material. For the inactivation of blood borne pathogens, the matrix materials containing blood are heated at 82° C. for 15 min. Each matrix was washed twice for 5 min each with 100 $\mu l$ of water and redried at 82° C. for 15 min. The matrices containing the cells were then amplified in thin-walled tubes under the following conditions in 50 $\mu l$ reactions: 10 mM Tris-HCl, pH 8.3, 50 mM KCl, 0.01% BSA, 0.2 mM of each of the 4 standard dNTPs, 2.25 mM $MgCl_2$, 0.5 $\mu M$ primers and 1.25 Units of Taq DNA polymerase. Thermocycling conditions were an initial denaturation at 94° C. for 3'50", followed by 30 cycles of 94° C., 45"; 60° C., 45"; 72° C., 1' and then a final extension at 72° C. for 5'. Following thermocycling, twenty microliters of each reaction were electrophoresed on a 3% agarose gel and products visualized with UV-illumination of the ethidium bromide stained gel. Primers, used for identity testing and recognizing a single human locus, generated the appropriate 115 base-pair amplification product from blood samples immobilized on the following kinds of matrices: Nylon 3-3710, Nitex Nylon, PeCap polyester twill 17/9, PeCap polyester 43/29, PeCap polyester 150/41, PeCap polyester 210/35, Tetex polyester (all from Tetko, Depew, N.Y.); Magna nylon (MSI, Westboro, Mass.); Hemadyne and Leukosorb (both from Pall BioSupport, Port Washington, N.Y.). No product band was apparent from the blood sample on a NFWA matrix (Gelman, Ann Arbor, Mich.).

Blood specimens were diluted to derive the sensitivity level, or copy number, at which a particular nucleic acid sequence could be detected. The number of cells containing nucleic acids in human blood is relatively constant so blood was diluted and each dilution was analyzed for the detection of a genetic sequence represented with two alleles per cell. Fresh human blood was collected from two individuals by fingerprick and either spotted directly onto a matrix or diluted in phosphate buffered saline and then spotted directly onto a matrix. Each dried matrix was added to a reaction vessel with a reaction mix containing the components as described previously, with a substitution of 1.5 mM $MgCl_2$, and thermocycled. A 115 base-pair product was generated by specific amplification of human genomic DNA. ISA-amplified product was seen from 2 microliters of immobilized human blood and 2 microliters of the following serial dilutions: 1:5; 1:10; 1:50; 1:100. These results demonstrate that a single-copy human gene can be amplified from 0.02 $\mu l$ of immobilized human blood, or approximately 100 cells. Bands were visible in other experiments from dilutions estimated to have fewer than 20 immobilized cells.

EXAMPLE 2

ISA of Virus on Blood Separation Membranes

Hemadyne lateral flow membrane was used to separate whole blood into a cellular fraction and a cell-free plasma fraction in order to investigate the capability of the RNA retrovirus, EIAV, to flow through the membrane with a plasma fraction and to be identified by ISA. One microliter of the supernatant of EIAV-infected equine dermal cell culture, was spotted onto Hemadyne alone or mixed with 5 microliters of human whole blood first and then spotted on Hemadyne, as well as whole blood alone. Sections of the Hemadyne membranes containing either the dried culture supernatant or plasma, which had been separated from the cellular fraction, were excised and used for ISA. The matrix pieces were added to separate reverse transcription reactions using Superscript Reverse Transcriptase (Life Technologies, Gaithersburg, Md.) according to manufacturer's instructions and incorporating an EIAV-specific primer. One-fourth of each reverse transcription reaction was amplified by Taq polymerase with an EIAV primer pair. Gel bands representing product amplified from EIAV virus immobilized on the Hemadyne were visualized from all reactions except those in which no EIAV had been added to the blood.

In other experiments, 10 microliters of horse blood, with and without EIAV-containing supernatant added, were applied to one end of a Hemadyne strip and flowed laterally across the strip. After lateral flow had ceased, the Hemadyne strips were dried and then cut into four sections and each section was amplified using rTth DNA polymerase (Perkin Elmer, Foster City, Calif.), EIAV primers and appropriate buffers and thermocycling conditions. Gel bands were seen from all four sections of matrix containing fractions of horse blood which were seeded with viral particles, evidence that viral particles are deposited over the entire area of the matrix during separation. In the pieces of matrix that were used to separate horse blood and not seeded with viral particles, a faint band was visible only from the matrix piece where the blood had been directly applied. When virus was present at very low copy number, as in the infected horse blood, a band was seen after amplification only in the portion of the matrix where blood was deposited directly on the membrane; when excess virus was added to the blood, the virus was detectable in all portions of the lateral flow matrix.

EXAMPLE 3

ISA of Retroviral RNA

A recombinant retrovirus was used to generate a suspension of viral particles with a known concentration of virus per milliliter. Then, known concentrations of virus could be used to examine the sensitivity of the RT- ISA method. A recombinant retroviral plasmid, pGT-1, derived from pLN [BioTechniques 7:980–990, 1989, Miller et al., "Improved retroviral vectors for gene transfer and expression"] contains two reporter genes, the β-galactosidase Lac Z gene driven by a mouse retroviral LTR promoter, and an aminoglycoside phosphotransferase, the Neo gene driven by the SV40 early gene promoter. The plasmid pGT-1 was transformed into a retroviral packaging cell line, ATCC PA317 (Tissue Culture Facility, Lineberger Cancer Center, University of North Carolina, Chapel Hill). PA317 cells are derived from mouse fibroblasts and engineered to contain env and pol genes which are needed for retroviral packaging. The cells will produce recombinant retrovirus after they are transformed with a retroviral vector containing the LTRs and a retroviral packaging signal. Several lots of recombinant retrovirus, vGT-1, were harvested from the transformed PA317 cells and stored at −80° C.

The pGT-1's reporter genes provide several means to perform viral titration. For example, the Neo gene was utilized in a colony forming assay to titer infectious retroviral virions. The Neo gene sequences were also used as targets for RT-ISA. In the colony forming assay, a limiting dilution of recombinant retrovirus was used to infect NIH 3T3 cells. Colonies were selected based on their resistance to G418. Since the NIH 3T3 cells lack a Neo gene and cannot grow under G418 antibiotic selection, only infected cells were able to form colonies. Viral titration by counting the colony-forming units (cfu) was the measure of infection competent virus. In order to select consistent and uniform recombinant retrovirus producers, clones were generated from several single cell colonies. The clones were characterized by their ability to produce consistently feasible amounts of recombinant retroviral particles. Recombinant retroviral seeds were selected on the basis of good cell viability, high yield and consistent viral production capability.

The vGT-1 was applied and dried on matrices in order to estimate the sensitivity of RNA amplification directly from immobilized virus. This served as a model for a viral load assay of HIV. Limiting dilutions of vGT-1 were made in order to titer the viral stock by RT-ISA and compare results with titration of the same stocks by cfu's. In the RT-ISA assay, 10 μl of serially-diluted viral stock were spotted onto matrices and the matrices were dried at 82° C. for 5 minutes. The drying temperature was selected because it was a temperature high enough to inactivate viral pathogens and cause dehydration, but not too high that the heat would cause strand breaks of the RNA. A limited heat treatment was considered to denature secondary structure for better primer and enzyme was analyzed by 2% agarose gel electrophoresis. No product was seen when no primers were added to the reaction. The number of virions in 10 μl, and in the subsequent dilutions in which ISA product was visible, were estimated by a colony-forming assay to be 3350; 670; 134 and 27. It is a random event whether the next dilution would contain a single cfu equivalent. RT-ISA was inhibited in reactions containing 20% of culture supernatant unless the dried matrices were washed before RT-ISA. In earlier experiments, ISA was successful only if the cells were washed with PBS and resuspended in FBS-free medium.

In another experiment, vGT-1, Clone #2–4, was diluted 1:5 with untreated, or heat-inactivated (55° C. for 45 minutes), normal human plasma. Ten microliters of the viral mixture and control RNA (1.25 attomole of RNA template per reaction from the Promega's Access kit) were applied to matrices. All matrices were dried at 82° C. for 5 minutes. ISA products were observed in heat-inactivated, but not untreated, plasma. While inhibiting factors in plasma can be heat-inactivated by exposure to long, high temperature, it is not practical to expose RNA to these conditions. Therefore, RNAse inhibitors, either 90 Units of RNasin (Promega) or 90 Units of Anti-RNase (Ambion, Woodland, Tex.), were added to some of the subsequent RT-ISA reactions. RNase inhibitors protected retroviral RNA, and naked RNA, from degradation to differing degrees.

In a similar experiment, matrices were prepared in untreated, normal human serum and stored at 4° C. for 26 hours. The ratio of ISA products from the naked RNA was more than two-fold greater than from retroviral RNA in heat-inactivated plasma reactions because of a much larger starting number of copies. In contrast, in the untreated plasma, the ISA product bands from naked RNA and retroviral RNA were equivalent in intensity. This result indicates that the RNA in the virion was protected from RNase degradation to a greater degree than naked RNA.

In a similar RT-ISA experiment, five-fold limiting dilutions of vGT-1, Clone #2–4 and naked, control RNA were amplified. Clone #2–4 of vGT-1 was mixed on ice with Anti-RNases (Ambion) at 5 U/μl final concentration, and diluted in PBS or the normal human plasma containing 2.5 U/μl of Anti-RNases (Ambion). Ten microliters of the viral mixture were applied to matrices. All matrices were dried by heating at 82° C. for 5 minutes and washed in 150 μl of ddH2O before placed in 50 μl of ISA reaction mix containing 2.5 mM of MgSO4, 5% DMSO, 0.2% BSA, 0.2 mM of dNTPs, 0.2 μM each of primers, 1.25 attomole of control RNA, and 5 units each of AMV reverse transcriptase and Tfl DNA polymerase. Reaction conditions were as above. The product was analyzed by 2% agarose gel electrophoresis. With the addition of anti-RNase, RT-ISA was sensitive down to at least a 1:625 dilution. Dilutions greater than 1:625 represent reactions containing less than ten copies (by cfu estimation), in which the presence of a copy is a random event. RT-ISA sensitivity in normal human plasma was determined to detect copy numbers as low as five cfu's.

The original number of RNA copies is difficult to precisely determine after amplification. RT-PCR and other amplification methods are thought to overestimate viral burden because not all copies of the viral genomic RNA are completely packaged into infective particles. Amplification methods, nevertheless, have become the accepted means to quantify viral burden. Viral co-culture of HIV-1 is tedious and generally underestimates the number of infectious viral particles. Given that results of colony-forming assays underestimate the number of virions, similar to plaque assays, then adding 100-fold more cfu's of vGT-1 would have been expected to generate bands comparable to control RNA used at 1.25 attomoles. Comparing the band intensities indicated that the control RNA was added at a higher copy number than vGT-1. Therefore, judging from all of the vGT-1 RT-ISA results, and from the fact that naked RNA from the cell lysate may not be long-lived, the cfu estimate may be closer to the number of actual viral RNA copies. ISA product was detected from the 1:625 dilution [estimated to be in the range of 27 cfu's] when anti-RNase was present in normal human plasma.

In other experiments, five microliters of the vGT-1 stock of Clone #2–4, were seeded into 200 microliters of whole blood or one milliliter of phosphate buffered saline. The blood and saline were passed sequentially through two different pipette tips fused to matrices, as described above as an embodiment of the device. The first and second matrices were removed from the pipette tips, dried and transferred to RT-ISA reactions, and amplified as described for Clone #2–4 in paragraph five of this Example. Amplified product bands were visible from reactions containing the second matrix, but not the first, through which the seeded plasma was passed. The devices are capable of capturing virus particles for ISA from a larger volume. It was possible that surfaces of the first matrix were saturated with other molecules and viruses passing through had a better chance of adhering to surfaces of the second matrix.

Other experiments demonstrated that it was possible to amplify and detect a RNA retrovirus without adding reverse transcriptase to the reaction. The native retroviral reverse transcriptase from the dried viral particles was sufficient for synthesis of a cDNA strand by simply adding deoxyribonucleotides (dNTPs) and priming oligonucleotides. The resulting, doubled-stranded RNA:cDNA hybrids are more stable than single-stranded viral RNA and protected from ribonuclease degradation. This discovery is applicable to stabilizing the viral template before inactivating its infectivity. Infectious samples present a handling risk. If an infectious sample was immediately added to a container holding dNTPs and primers and incubated for 15 to 30 minutes, a cDNA copy will be synthesized on the RNA template. The effect of RNase is negligible on ISA once a cDNA copy is made. The double-stranded nucleic acid (RNA:cDNA hybrids) can be heated to a temperature that denatures the viral proteins and renders the sample non-infectious, making the sample safer for handling and transport without destroying its amplification competence. This embodiment of the invention provides a quick and easy means to stabilize single-stranded RNA before using treatments to inactivate the infectivity of the sample.

EXAMPLE 4

Touch Print ISA

The ability of a fibrous matrix material to actively pick up and immobilize cells for detection of a gene sequence present at one or two copies per cell was determined by the following experiments. Equine dermal cells that had been grown to a confluent monolayer on either plastic tissue culture plates, or on sterile glass chamber slides, were washed twice with phosphate buffered saline and drained briefly to remove excess PBS while also keeping the cells adhered to the plastic or glass. Small squares of matrix (approximately 4–9 $mm^2$) were gently touched to the surface of a portion of the moist cell monolayer to collect cells. The matrices were then transferred to reaction vessels and dried and washed as described above. Reaction mixtures were as described for Example, except for a change to 1 mM $MgCl_2$ and primers recognizing single-copy, equine gene sequences for tumor necrosis factor and a 55° C. annealing temperature. The expected 245 base-pair amplification product, that was obtained from horse genomic DNA, was observed from cells grown on either plastic or glass and printed onto any one of three matrices for ISA (Nylon 3-3710, PeCap polyester 17/9, PeCap polyester 43/29).

Small pieces of matrices are difficult to handle whether manufacturing or using them as devices. Squares cut from Nylon 3-3710 were adhered with a double-sided adhesive transfer tape (#443PC, 3M, St. Paul, Minn.) to a polycarbonate film of the same length and width of the matrix square, but having a thickness of 0.007 inch (178 microns), to support the matrix and make it more easily handled. The results showed that the matrix's ability to pick up cells and amplify nucleic acids from them, under ISA conditions as described in the preceding paragraph, was not altered or compromised if the matrix was attached to an adhesive and backing for support. The sandwich formed by the matrix, adhesive and backing was submerged in the enzymatic amplification and hybridization reagents, indicating that all materials used in fabricating it were biocompatible.

EXAMPLE 5

ISA of RNA

RNA expression was analyzed from immobilized cells. Transcription and amplification of messenger RNA was demonstrated in human CEM cells immobilized on Nylon 3-3710 matrices. A derivative of human lymphoblastoid CEM cells growing in suspension culture were concentrated by centrifugation and then resuspended in culture media containing serum. Aliquots containing approximately 10,000 cells were applied to small squares (4–9 $mm^2$) of matrix, dried and washed as described above. The combined reverse transcriptase and amplification system sold by Boehringer Mannheim, as their Titan RT-PCR System, containing a 1× reaction buffer of 1.5 mM $MgCl_2$ and DMSO, 0.2 mM dNTP's, 0.01% bovine serum albumin, 5 mM dithiothreitol, 0.5 $\mu$M of each primer and 1 $\mu$l of Titan enzyme mix was added directly to the dried matrices. Reactions were subjected to an initial 30 minute incubation at 50° C. to allow reverse transcription of mRNA, followed by 30 cycles of 94° C., 45"; 60° C., 45"; 72° C., 15" and a final extension incubation at 72° C. for 5 min. Oligonucleotide primers homologous to two exons of the tumor necrosis factor gene (TNF-α) generate a 568 base-pair product of DNA amplification and a 266 base-pair product resulting from RT-PCR amplification of the spliced tumor necrosis factor messenger RNA. The results were comparable to amplification of total nucleic acids isolated from human CEM cells.

The primer pair for TNF-α gene also discriminated mRNA from its DNA template in mouse cells. Serial dilutions of cultured 3T3 cells were spotted and dried onto the matrices. The matrices were added to RT-ISA reactions containing the TNF-α primer pair. The ISA and RT-ISA products were visualized by agarose gel electrophoresis. The signal generated from the DNA template was expected to be larger since it contains an intron. 265 base-pair fragments for the TNF-α mRNA target were visualized from as low as 10 mouse cells while the larger ISA product from its DNA template was detected from 400 mouse cells.

In a similar experiment, a serial amount of NIH 3T3 cells (3.2 cells, 16 cells, 80 cells, 400 cells, 2,000 cells, and 10,000 cells) were spotted onto matrices and dried for 5 minutes at 82° C. RT-ISA mix containing 10 mM Tris HCl pH 8.3, 50 mM KCl, 0.01% bovine serum albumin, 0.2 mM of each of the fours standard dNTPs, 2.5 mM MgSO4, 0.5 $\mu$M of each of the TNF-α a primers, 5 units of AMV reverse transcriptase and 5 units of Taq DNA polymerase (Promega's Access), in a total volume of 50 $\mu$l was added directly to tubes containing the matrix with immobilized cells. Reverse transcription was done at 48° C. for 30 minutes followed by a denaturation at 94° C. for 3 min 50 sec, thirty cycles of 94° C., 45 sec; 60° C., 30 sec; 72° C., 25 sec and a final extension at 72° C. for 5 min. The same primer pair as used in human cells generated a 265 base-pair product from mRNA while the TNF-α genomic template yielded a 387 base-pair product in mouse cells.

The signals were proportional to the amount of cells used in limiting dilutions, representing a quantitative measurement of the target RNA templates. The differences between the amount of product derived from mRNA template relative to that derived from DNA template also reflect the differences in mRNA and DNA copy number that would be anticipated. As the number of cells in the RT-ISA reaction decreased, the signal generated by product from the DNA template decreased without effecting a decrease in the signal from mRNA template. The number of mRNA targets would be expected to be greater than the number of genomic targets. Therefore, RT-ISA generated quantitative results as mRNA template was favored at limiting dilutions of the DNA template. Utilizing different manufacturer's combined enzymes system (Titan or Access) produced similar, if not the same, results.

RT-ISA experiments were also performed as above except the specimen was 2 μl of whole blood from a finger puncture, dried on the same type of matrix material. A pattern of TNF-α mRNA and DNA products were amplified similar to the results from the limiting dilution of cultured cells. The DNA target was amplified to levels that were easily detectable from as little as 1 μl of immobilized blood. This amount of blood contains an estimated 5000 cells or 10,000 copies of the target gene. Heme generally does not inhibit an ISA reaction when the total amount of whole blood is not greater than 10% of the ISA reaction volume. If the matrices containing dried blood are washed with water, most of the visible heme is removed. Any remaining inhibitors, including heme may be tightly bound to the matrix and may therefore be unable to act as inhibitors in the ISA reaction. Alternatively, the inhibitors remaining following the wash may be accessible during the ISA but may be present in low enough concentration that PCR is not affected.

RNA was also analyzed from human breast cancer specimens. Pathologists [Rex Healthcare Laboratory, Raleigh, N.C.] collected sets of five samples from a fresh, surgically-removed specimen, by touching ISA collection devices to the center and the outer edge of the tumor, the border between tumor and normal tissue, and normal tissue approximately one and two centimeters away from the tumor. The ISA devices containing specimen were immediately dried in an oven at 82° C. for 5 minutes and stored until RT-ISA was performed. Primers were designed to distinguish between the RNA and DNA of the erb-B2 and TNF-α genes. Differences in the ratios of DNA to RNA were observed between the normal and tumor specimens in several patients. The intensity of ISA products bands produced patterns between normal and tumor tissue specimens that indicated spontaneous amplification of erb-B2 DNA in tumors and an accompanying increase in its mRNA expression. The band intensities of TNF-α DNA remained more constant in the normal and tumor tissue specimens of the same patient, while the TNF-α mRNA band intensities increased in the tumor tissue relative to the DNA signal of the specimen. The ISA assays are significant in measuring gene expression and DNA in the same specimen, as well as comparing the nucleic acid composition of one specimen to another. Using DNA as a measure of the number of cells in a specimen and a comparison standard for mRNA expression will be useful in tumor research and prognosis. Additionally, individual mutations can be as easily characterized in ISA specimens in order to characterize the metastatic potential or drug resistance of tumors. An advantage of ISA for mRNA detection is that it is a simple means to detect mRNA directly from cells of interest without extraordinary measures.

EXAMPLE 7

Array Detection of Single-base Polymorphisms

Primers were selected to amplify a large region of the human CYP2D6 gene that includes exon 3–6 and the A, B, T and E polymorphic alleles. Four oligonucleotides, modified with an amine on the 5' end, were custom-synthesized, (Life Technologies, Gaithersburg, Md.), such that the terminal base represented one of the two polymorphic alleles for A, and also for E. Approximately 25–50 nanoliters of 10 and 100 micromolar solutions of these 5' amine-modified oligonucleotides were applied to the surface of different materials with a Multi-Blot Replicator and positioning frame system (V & P Scientific, San Diego, Calif.). Materials such as Pecap polyester (Tetko), Immunodyne, Biodyne A, B and Plus membranes (Pall Gelman Corporation) were adequate to observe the positive signals with the naked eye, ranging from 0.5–1 millimeter in diameter. A detector probe was constructed by polymerase chain reaction of genomic DNA, using one primer comprised of CYP2D6 sequences adjacent to the A locus and another, opposing primer comprised of CYP2D6 sequences adjacent to the E locus. The smaller region amplified by the probe primers was labeled with the AlkPhos Direct reagents (Amersham Life Science, Arlington Heights, Ill.).

The first step consisted of direct amplification of the large region of CYP2D6 from immobilized, subject cells using standard ISA reagents. Five microliters of amplified product and five microliters of AlkPhos detector probe were denatured and added with 2 microliters of ligase (Life Technologies) and 8 microliters of ligase buffer to the array consisting of the four capture oligonucleotides immobilized on one of the materials. The probe array reaction was incubated for four hours at 16° C. The probe array was rinsed with distilled water, equilibrated in alkaline detection buffer, then incubated in the dark in detection buffer with BCIP and NPT substrates, (Boehringer Mannheim, Indianapolis, Ind.) in order to develop color in the spots where the subject product annealed to its complementary capture and detector probes adjacently for ligation of the detector probe to the capture probe and, thus, immobilization of alkaline phosphotase-labeled detector probe. The colored enzyme precipitate remained localized at the sites of capture probes in which the subject amplified product matched the exact compliment for one or two A alleles and one or two E alleles. This detection method can be expanded to detect the B and T loci in the same reaction as A and E by including additional detector probe and capture oligonucleotides in the array. The Replicator printed oligonucleotides in a pattern of 1536 per 8 centimeters by 12 centimeters of material and the material was cut into centimeter squares containing 16 probes each. It was possible to visualize and image 16 different probe positions per specimen in a one square. An adhesive backing on the material allowed cut squares to be securely positioned on a flat surface (standard glass slides) and framed by punching out openings in a Gel Tek strip (Ray Chem Corporation, Menlo Park, Calif.) to make separate reaction wells for each square. Clear film covers stuck to the gel to prevent the reaction from drying out. The covers were easily removed from, and replaced on, the gel for adding and removing reagents.

What is claimed is:

1. A device to collect and process a small amount of a biological specimen, said biological specimen selected from a group consisting of liquid and solid tissues, comprising (a) a matrix selected for its ability to adhere and immobilize one or more cells and viruses present in the biological specimen, said matrix comprising a durable fibrous structure that (i) collects cells and viruses upon contact;

(ii) drys quickly to dehydrate said cells and viruses to preserve native nucleic acids; and (b) a handle, said matrix affixed to said handle, and said handle capable of directing said matrix into contact with cells and viruses;

wherein the nucleic acids of cells and viruses immobilized on said matrix are detectable for the comparison of particular nucleic acid sequences in said biological specimen with another biological specimen; and wherein the nucleic acids that are detectable are selected from a group consisting of RNA and DNA.

2. The device according to claim 1 wherein the matrix is a porous matrix selected from the group consisting of cellulose, nylon and polyester fibers manufactured by a method selected from the group consisting of compressing, extruding, spinning, weaving and laminating.

3. The device according to claim 1, wherein the matrix is capable of being detached from an end portion of the handle; and said handles of said devices capable of being connected and released, one device to another.

4. The device according to claim 1, wherein the matrix has been treated to increase its hydrophilic surface characteristics.

5. The device according to claim 1, wherein the matrix has been treated with a mild acidic treatment to improve cell retention.

6. The device according to claim 1, wherein the matrix has a thin, flat shape.

7. The device according to claim 1, wherein the matrix comprises thread-like fibers.

8. The device according to claim 1, further comprising an aggressive transfer adhesive for affixing the matrix to a handle to hold the matrix on during collection and processing of the biological specimen.

9. The device according to claim 1, wherein there are multiple handles, each of which has an attached matrix, joined by a spline.

10. The device according to claim 9, wherein the matrices are spaced apart from each other to accommodate collection of different specimens and the transfer of matrices to a particular reaction vessel.

11. The device according to claim 9, wherein there are openings punched in the spline.

12. The device according to claim 9, wherein there are multiple handles are mounted in a matchbook arrangement.

13. The device according to claim 1, further comprising bar code labels on the device.

14. The device according to claim 1, wherein the matrix is fused to the smaller end of a tubular handle in a way that a liquid volume of a biological specimen larger than the matrix holds may pass though said matrix.

15. The device according to claim 1, wherein the matrix is known to absorb a predetermined quantity of biological specimen.

16. The device according to claim 1, further comprising a probe array representing different sequence combinations to which complementary nucleic acids amplified from the nucleic acids of the biological specimen may bind, if present in the biological specimen immobilized on the matrix.

* * * * *